Figure 1:
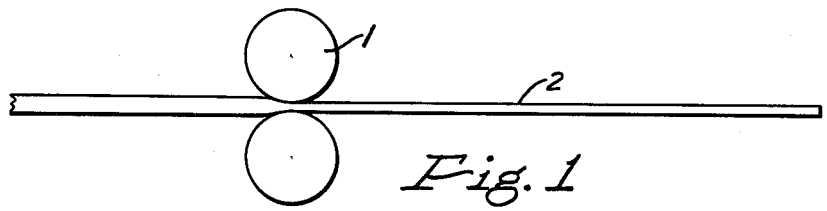

Dec. 18, 1962 K. W. WIEDT, JR 3,068,564
METHOD OF PRODUCING LAMINATED METAL STRIP
Filed Feb. 17, 1960

INVENTOR.
KARL W. WIEDT, JR.
BY Brown, Critchlow, Flick & Peckham
HIS ATTORNEYS 3,068,564
METHOD OF PRODUCING LAMINATED
METAL STRIP
Karl W. Wiedt, Jr., Pittsburgh, Pa., assignor to Universal-Cyclops Steel Corporation, Bridgeville, Pa., a corporation of Pennsylvania
Filed Feb. 17, 1960, Ser. No. 9,339
6 Claims. (Cl. 29—471.1)

This invention relates to the production of laminated metal strip from metals difficult to laminate and more particularly to laminating under heat and pressure only. Laminated as used herein, means that the metal strips forming the laminate are bonded together continuously throughout the areas of their adjoining surfaces, and not just in spots spaced by unjoined areas.

Laminated metal strip is now produced in several different ways, such as by casting a metal around or against one side of a sheet or strip, or by metal plating. In instances where sheets that have a melting point above 2400° F. have been heated and rolled together, either an intermediate bonding layer has been necessary to cause them to adhere to one another, or the adjoining surfaces have had to be cleaned carefully and then the air exhausted from between them. Moreover, in all of these prior methods, only a few laminations are provided.

It is among the objects of this invention to provide a method of producing a laminated metal strip from dissimilar rolled metal sheets having melting points above 2400° F., in which no bonding layer is used between them, in which cleaning of their adjoining surfaces is unnecessary, in which air does not have to be excluded from between those surfaces, in which rolling of a stack of hot sheets is the only thing that causes them to stick together, and in which any desired number of sheets can be laminated.

In accordance with this invention, a number of thin rolled sheets of metal of at least two different compositions and having melting points above 2400° F., are taken just as they come from the rolling mill and are assembled into a stack with their untreated surfaces in contact with one another. Sheets of one metal are separated by a sheet of dissimilar metal. For example, if only two different kinds of metal are used, the sheets are alternated. The stack is then placed in contact with a pair of cover plates that also have a melting point above 2400° F. and a thickness greater than the sheets in the pack. The edges of the sheets and plates are welded together to hold the pack together, and then the pack is heated to hot rolling temperature and rolled. The rolling is continued long enough to reduce the pack at least about 50 percent and to reduce the thickness of the individual sheets to a maximum of .015 inch. This causes the sheets to bond together into a laminated strip. The cover plates must be thick enough originally to avoid sticking to the laminated sheets between them. After the pack has been rolled, the final step in the process is to peel the reduced cover plates from the laminated strip in order to uncover it.

Figure 2:
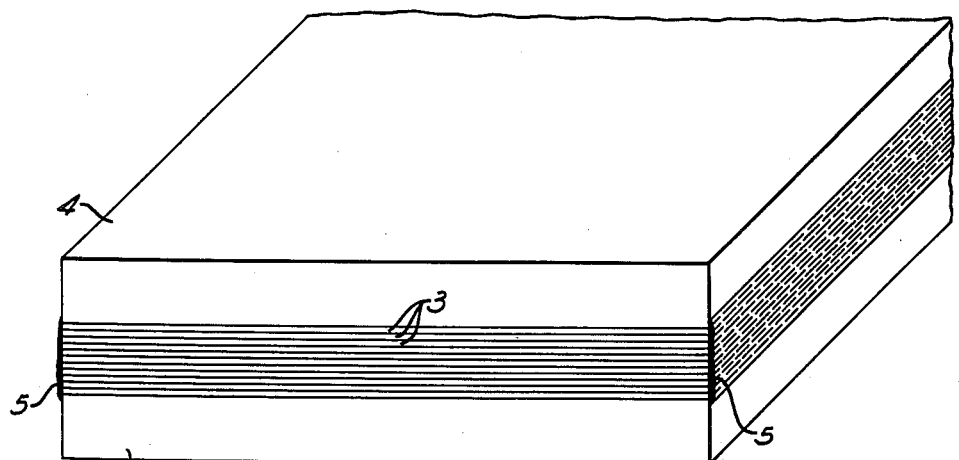
Figure 3:
Figure 4:
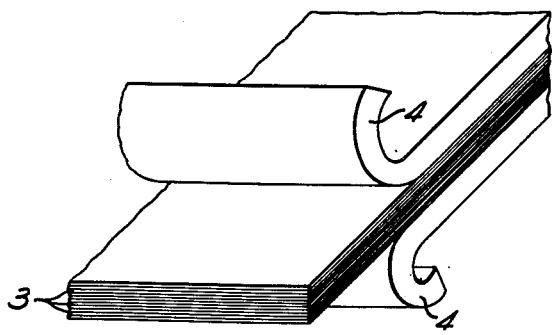

The preferred embodiment of the invention is illustrated in the accompanying drawings, in which:

FIG. 1 is a side view of a sheet being hot rolled;
FIG. 2 is an enlarged perspective view of one end of a pack ready to be rolled;
FIG. 3 is a reduced side view of a pack being rolled in a mill; and
FIG. 4 is a perspective view showing the cover plates being removed from the laminated strip.

Referring to FIG. 1 of the drawings, metal sheets are formed by rolling the desired metal in a mill 1 to form thin material 2, in some cases about .050 inch thick. This material is then cut into lengths to form sheets. Sheets of at least two dissimilar metals are produced in this way. For example, they may be different types of steel, such as plain carbon steel and stainless steel, or they may be completely unlike metals, such as stainless steel and molybdenum or nickel and molybdenum. In every case, the melting points of the metals selected should be above 2400° F., because this invention deals only with metals that are difficult to laminate and would not be expected to stick together, and not with metals of lower melting points that can be laminated in simpler ways.

The sheets 3 are taken, with their surfaces just as they come from the rolling mill, and are arranged in a stack as shown in FIG. 2. Their untreated surfaces are disposed in direct contact with one another. By "untreated" is meant that nothing is done to the surfaces of the sheets after they leave the last roll pass. They are neither sand blasted, pickled, or otherwise cleaned. Also, no bonding layers are placed between them. Generally, the sheets are arranged in the stack with no two sheets of the same material in contact with each other. Thus, where only two metals are used, the sheets are alternated. As far as practicing the method disclosed herein is concerned, it is immaterial as to which metal forms the outer sheets of the stack. In fact, one metal may form one side of the stack and another metal the other side. However, for other reasons, only certain metals will generally form the outer sheets, as when stainless steel and molybdenum are stacked together. The stainless steel sheets are placed at the outer sides of the pack in order to protect the molybdenum sheets, which would tend to vaporize under high temperatures.

The number of sheets in a stack will depend upon the ultimate use that is to be made of the laminated strip which is to be produced. There can be anywhere from two to a great many sheets in a stack. In one case, six sheets of stainless steel and five sheets molybdenum were stacked together in alternating relation. Preferably, all of the sheets have substantially the same thickness, usually not over ⅛ inch. Thicker sheets can be used, but in that case more rolling will be required after the stack has been formed.

The stack of sheets of dissimilar metals is placed between and in contact with a pair of relatively thick cover plates 4 that also have a melting point above 2400° F. The composition of the cover plates is not material; they usually will be an inexpensive metal such as low carbon steel, although stainless steel can be used just as well. The stack of sheets and cover plates form a pack, and the edges of the sheets and plates are then welded to one another, as at 5, to hold the pack together, except that at the rear end of the pack the edges are not joined together, at least not all of the way across the pack. The free edges permit air to escape from between the different layers as the pack is reduced in the subsequent rolling operation. For a reason that will be explained presently, the cover plates should be heavy enough to remain at least .050 inch thick after the pack has been rolled the intended amount.

The next step is to heat the pack in a furnace (not shown) to a temperature at which it can be hot rolled. For best results, it is heated nearly to the incipient fusion point of the lowest melting point metal in the pack. In the case of a pack of stainless steel and molybdenum, it is heated to a temperature between 2100° F. and 2200° F. The pack is then rolled in a hot mill 6 for enough passes to reduce its thickness at least about 50 percent, and in many cases 90 percent or more. In every case the rolling must be sufficient to reduce the thickness of the individual sheets being laminated to .015 inch or less. Preferably, they are reduced to about .005 inch in thickness. It has been found that when the sheets are reduced in this amount under heat and pressure, they bind themselves tightly and securely together throughout their areas to form a solid laminated strip. Even with very thin sheets, the 50 percent or more reduction is required in order to produce enough working of the metals to cause the sheets to stick together. The reason why the laminations bind themselves together so securely and permanently is not understood by us, but the fact remains that they do so.

The cover plates maintain heat in the stack of sheets during rolling and prevent the outermost sheets from being cooled by the mill rolls, which would interfere with their bonding to the rest of the sheets. However, to keep the cover plates from sticking to the laminated strip between them, the individual plates should not be reduced to a point less than about .050 inch thick. As long as they remain that thick, they will not stick to the laminated strip and therefore they can be stripped off it as soon as the rolling has been completed. Before the plates are peeled from the laminated strip, the welded edges of the rolled pack are sheared off. When the cover plates are removed, the laminated strip is exposed and can be further processed as desired.

In one specific example, six sheets of high heat-resisting stainless steel and five sheets of pure molybdenum were asembled into a stack in alternating relation. Each sheet was .050 inch thick. The stack was placed between two steel cover plates, each of which was .500 inch thick. None of the pieces were cleaned or had their surfaces otherwise prepared before assembling the pack. Also, no coatings were applied to the different layers, nor was any bonding material placed between them. The edges of the sheets and cover plates making up the pack were welded together, except along the back edge to provide for the escape of air between the layers of the pack. After the welding operation, the pack was heated to a temperature between 2100° and 2150° F. and then was rolled in a roughing mill to a thickness of ⅜ inch. That reduction was accomplished in six passes through the mill. The reduced pack was then transferred immediately to a finishing mill where it was rolled in four passes to a thickness of .174 inch. After that the pack was allowed to cool on the mill floor.

After cooling, the edges of the pack were sheared and the outer sheets forming the top and bottom cover plates were peeled away from the pack by grasping the edges with tongs and bending them back. This left a laminated strip consisting of eleven alternating layers of steel and molybdenum having a total thickness of .062 inch, because the cover plates that were stripped off were each .056 inch thick. The eleven laminations were bonded so securely together that the laminated strip could be bent flat upon itself without affecting the bond. Some uses for such material are gas turbine blades and jet engine parts that are exposed to great heat, which would destroy the high strength molybdenum if it were not protected by heat-resisting stainless steel.

The advantages of my method of making a laminated metal strip from material that is considered to be hard to laminate are obvious. It requires no bonding material between the sheets, no special cleaning of the sheets and no exclusion of air from between the sheets. The entire laminating operation is accomplished simply by rolling a heated pack of plates and sheets a certain amount as disclosed in the foregoing description.

This application is a continuation-in-part of my copending metal strip from material that is considered to be hard to 15, 1957, and now abandoned.

I claim:

1. The method of producing a laminated strip from dissimilar rolled metal sheets having melting points above 2400° F. and having untreated surfaces just as they come from the last roll pass, the method comprising placing said sheets with their said surfaces in contact with one another to form a stack wherein sheets of one metal are separated by a sheet of a dissimilar metal, placing said stack between and in contact with a pair of cover plates that have a melting point above 2400° F. and are thicker than the sheets to form a pack, welding the edges of the sheets and plates to one another to hold the pack together, heating the pack to nearly the incipient fusion temperature of the lowest melting point metal in the pack, rolling the heated pack to reduce its thickness at least about 50 percent and to reduce the thickness of the individual sheets to a maximum of about .015 inch to thereby bond them directly together into a laminated strip continuously throughout their adjoining areas, said cover plates originally being thick enough to avoid sticking to the laminated strip between them after said rolling, and stripping the reduced plates from the laminated strip to uncover it.

2. The method according to claim 1, in which said cover plates are at least about .050 inch thick after said pack rolling.

3. The method according to claim 1, in which the individual sheets are reduced in the pack to a thickness of about .005 inch.

4. The method of producing a laminated strip from dissimilar metals having melting points above 2400° F., comprising rolling said metal to produce sheets about .050 inch thick, taking said sheets with their surfaces untreated just as they come from the last roll pass and placing them in contact with one another to form a stack wherein sheets of one metal are separated by a sheet of a dissimilar metal, placing said stack between and in contact with a pair of cover plates that have a melting point above 2400° F. and are at least .500 inch thick to form a pack, welding the edges of the sheets and plates to one another to hold the pack together, heating the pack to nearly the incipient fusion temperature of the lowest melting point metal in the pack, rolling the heated pack to reduce its thickness about 90 percent to thereby reduce the individual plates to a minimum of .050 inch thick and the individual sheets to a thickness of about .005 inch, and stripping the reduced plates from the reduced stack of sheets to leave a laminated strip in which all adjoining surfaces are bonded together continuously throughout their areas.

5. The method of producing a laminated metal strip from unprepared metal sheets, comprising placing a stack of thin metal sheets in contact with one another between and in contact with a pair of cover plates of materially greater thickness than the sheets to form a pack, welding the edges of the sheets and plates to one another to hold the pack together, heating the pack to hot rolling temperature, rolling the heated pack to reduce its thickness at least about 50% and to reduce the thickness of the individual sheets to no more than about .015 inch to thereby bond them directly together into a laminated strip continuously throughout their adjoining areas, said cover plates originally being thick enough to remain at least about .050 inch thick after said rolling so that they will not stick to the laminated strip between them, and stripping the reduced plates from the laminated strip to uncover it.

6. The method of producing a laminated strip from unprepared thin metal sheets, comprising placing between and in contact wtih a pair of metal plates about one inch thick a stack of said sheets in contact with one another, each sheet being about .125 inch thick, welding the edges of the sheets and plates to one another to hold the pack together, heating the pack to hot rolling temperature, rolling the heated pack to reduce the thickness of the individual sheets to less than .015 inch to thereby bond them directly together into a laminated strip continuously throughout their adjoining areas, said rolling being insufficient to reduce the thickness of said cover plates below .050 inch so that they will not stick to the laminated strip between them, and stripping the reduced plates from the laminated strip to uncover it.

References Cited in the file of this patent

UNITED STATES PATENTS

| | | |
|---|---|---|
| 19,261 | Purchase | Feb. 2, 1858 |
| 623,652 | Carter | Apr. 25, 1899 |
| 1,340,149 | Browne | May 18, 1920 |
| 2,645,842 | Orr | July 21, 1953 |
| 2,653,117 | Keene | Sept. 22, 1953 |
| 2,813,333 | Pompa | Nov. 19, 1957 |